Patented June 8, 1954

2,680,705

UNITED STATES PATENT OFFICE 2,680,705

TREATING BAKER'S YEAST

Karl Schneider, Mannheim, Germany, assignor to Backhefe G. m. b. H., Frankfurt am Main, Germany, a firm No Drawing. Application December 5, 1950,
Serial No. 199,370

8 Claims. (Cl. 195—93)

This invention is concerned with improvements in and relating to the treatment of baker's yeast.

It is known that baking yeasts, produced by the usual methods, when stored for long periods show a reduction in activity. It is also known that baking yeasts lose a portion of their activity during drying and that on long storage of dried baking yeasts a reduction of activity is also noticeable.

The object of the present invention is to provide a process for the production of baking yeasts which do not show the above-mentioned disadvantages.

According to the invention the production of baking yeast is carried out by the aerobic process from sugar-containing substrates, in such a way that after the conclusion of the usual stage of multiplication of the yeast the addition of substrate is continued during its ripening stage. At the same time, the addition of nitrogen compounds and if desired also of phosphates is discontinued, whilst the supply of air is so increased that the greater part of the sugar contained in the substrate is burnt to carbon-dioxide. The effect of the increased supply of air is that the alcohol, which is formed as an intermediate product is immediately burnt so that at no stage of the entire duration of the process is alcohol present in the wort.

The process can be carried out in such a manner that the yeast grown during the stage of multiplication is directly allowed to ripen under the above stated conditions. It can however also be first separated from the wort and then only subjected to the stated procedural measures.

Attempts have already been made to avoid the loss of activity during storage of baking yeast by diverse subsequent treatment processes. Thus it is known to subject a baking yeast to a treatment with stirring in alcoholic solution. Baking yeasts have also been subjected to a subsequent fermentation with aeration. Finally, baking yeasts have been treated with solutions of salts, such—for example—as phosphates, lactates or the like. None of these known processes has, in practice, given satisfactory results, and the process according to the present invention is distinguished from the known processes, by its greater effectiveness.

It is advantageous to carry out the process according to the invention in such a way that towards the end of the stage of multiplication of the yeast, the temperature, which is generally about 30° C., is raised up the limit of its ability to live. This high temperature is maintained during the following ripening stage.

It has further been found that it is advantageous, during the ripening stage, wholly or partially to replace the usual sugar-containing substrates by substrates which are poor in or free from growth- or activity-promoting substances. Thus alcohol-containing worts, such as are, for example obtained in a preceding yeast production phase, can be utilised as a substrate poor in activity promoting substances.

The nature of the pitching or seeding yeast employed may also be of importance for the success of the process according to the invention. It has been found that specially good results are obtained if yeasts are employed which do not give highest yields, but whose productivity is only mediocre.

The carrying out of the process according to the invention will be further explained below by means of an example without any limitation of the invention to the stated experimental conditions being intended.

Example

A production of yeast in which no alcohol is found in the wort at the end of the fermentation, is carried out with 300 kg. of pitching or seeding yeast (Stellhefe) and 1000 kg. of molasses, with the usual addition of inorganic nutrient salts. During the first half of the fermentation the temperature is kept at 30° C. It rises towards the end of the fermentation to 35° C. As soon as the addition of the molasses and nutrient salts is ended 400 kg. of molasses or 500 kg. of woodsugar molasses or the residue from the first pitching or seeding yeast stage, which contains 200 l. alcohol is run in over a period of four hours with especially strong aeration. The temperature rises to 36° C. The amount of air which is introduced should be so increased that no alcohol is formed in the wort. It is necessary to cool strongly in order to conduct away the heat generated. The yeast is separated from the wort immediately after the completion of the running-in. 1200–1300 kg. of yeast are obtained.

What I claim is:

1. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, thereafter adding sugar containing substrates to the wort without the addition of nitrogen compounds, aerating said wort sufficiently strongly that the greater part of the sugar is oxidized to $CO_2$ and the wort is substantially free from alcohol.

2. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, thereafter adding sugar containing substrates to the wort without the addition of phosphates and nitrogen compounds, aerating said wort sufficiently strongly that the greater part of the sugar is oxidized to $CO_2$ and the wort is substantially free from alcohol.

3. A process of treating baker's yeast which comprising introducing yeast into a nutrient medium suitable for growth of said yeast together with nutrient salts, maintaining a sufficiently high temperature with aeration to cause growth of said yeast until fermentation is substantially complete, the temperature at the end of said fermentation being raised to the limit of the ability of the yeast to live, thereafter adding sugar containing substrates to the wort without the addition of nitrogen compounds, aerating said wort sufficiently strongly that the greater part of the sugar is oxidized to $CO_2$ and the wort is substantially free from alcohol.

4. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, thereafter adding sugar containing substrates to the wort without the addition of nitrogen compounds, aerating said wort sufficiently strongly that the greater part of the sugar is oxidized to $CO_2$ and the wort is substantially free from alcohol, and maintaining a temperature of about 36° C. during said strong aeration.

5. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, thereafter adding alcohol containing liquor to the wort without the addition of nitrogen compounds and phosphates, aerating said wort sufficiently strongly that the alcohol is substantially oxidized to $CO_2$.

6. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, the temperature at the end of said fermentation being raised to the limit of the ability of the yeast to live, thereafter adding sugar containing substrates to the wort without the addition of nitrogen compounds, aerating said wort sufficiently strongly that the greater part of the sugar is oxidized to $CO_2$ and the wort is substantially free from alcohol and maintaining said high temperature during said strong aeration.

7. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, removing said yeast from the wort and adding to said yeast sugar containing substrates without the addition of nitrogen compounds, aerating said wort sufficiently strongly that the greater part of the sugar is oxidized to $CO_2$ and the wort is substantially free from alcohol.

8. A process of treating baker's yeast which comprises introducing yeast into a nutrient medium suitable for growth of said yeast together with nutrient salts, maintaining a sufficiently high temperature with aeration to cause growth of said yeast until fermentation is substantially complete, removing said yeast from the wort and adding to said yeast sugar containing substrates without the addition of nitrogen compounds, aerating said wort sufficiently strongly that the greater part of the sugar is oxidized to $CO_2$ and the wort is substantially free from alcohol and maintaining a temperature of about 36° C. during said strong aeration.

References Cited in the file of this patent

UNITED STATES PATENTS

| Number | Name | Date |
|---|---|---|
| 1,722,803 | Klein | July 30, 1929 |
| 1,767,646 | Bratton | June 24, 1930 |
| 1,774,546 | Claassen | Sept. 2, 1930 |
| 1,920,395 | Jellinek | Aug. 1, 1933 |
| 2,013,456 | Braasch et al. | Sept. 3, 1935 |
| 2,059,980 | Bennett | Nov. 3, 1936 |
| 2,122,939 | Hansen | July 5, 1938 |
| 2,183,570 | Irvin et al. | Dec. 19, 1939 |
| 2,304,471 | Meyer et al. | Dec. 8, 1942 |
| 2,367,931 | Deloffre | Jan. 23, 1945 |

FOREIGN PATENTS

| Number | Country | Date |
|---|---|---|
| 390,114 | Great Britain | of 1932 |